(12) United States Patent  
Barker et al.

(10) Patent No.: US 8,880,477 B2  
(45) Date of Patent: Nov. 4, 2014

(54) LATENCY-AWARE LIVE MIGRATION FOR MULTITENANT DATABASE PLATFORMS

(71) Applicant: NEC Laboratories America, Inc., Princeton, NJ (US)

(72) Inventors: Sean Barker, Sunderland, MA (US); Yun Chi, Monte Sereno, CA (US); Hyun Jin Moon, Newark, CA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 139 days.

(21) Appl. No.: 13/645,103

(22) Filed: Oct. 4, 2012

(65) Prior Publication Data

US 2013/0085998 A1  Apr. 4, 2013

Related U.S. Application Data

(60) Provisional application No. 61/542,994, filed on Oct. 4, 2011, provisional application No. 61/543,012, filed on Oct. 4, 2011.

(51) Int. Cl.
*G06F 17/30* (2006.01)
*G06F 9/455* (2006.01)
*G06F 9/50* (2006.01)

(52) U.S. Cl.
CPC .............. *G06F 9/455* (2013.01); *G06F 17/303* (2013.01); *G06F 9/5088* (2013.01)
USPC .......................................................... 707/649

(58) Field of Classification Search
None
See application file for complete search history.

(56) References Cited

PUBLICATIONS

Das et al., "Live Database Migration for Elasticity in a Multitenant Database for Cloud Platforms," UCSB Computer Science Technical Report 2010-09, 2010.*

Chen et al., "Autonomic provisioning of backend databases in dynamic content web servers," International Conference on Autonomic Computing, ICAC'06, IEEE, 2006.*

Clark, C., et al. "Live Migration of Virtual Machines" Proceedings of the 2nd ACM/USENIX Symposium on Networked Systems Design and Implementation (NSDI 2005). May 2007. pp. 273-286.

Curino, C., et al. "Workload-Aware Database Monitoring and Consolidation" Proceedings of the ACM SIGMOD International Conference on Management of Data (SIGMOD'11). Jun. 2011. pp. 313-324.

Das, S., et al. "Albatross: Lightweight Elasticity in Shared Storage Databases for the Cloud Using Live Data Migration" Proceedings of the VLDB Endowment (PVLDB), vol. 4, No. 8. Aug. 2011. (12 Pages).

Elmore, A., et al. "Who's Driving This Cloud? Towards Efficient Migration for Elastic and Autonomic Multitenant Databases" UCSB Computer Science Technical Report. May 2010. pp. 1-5.

(Continued)

*Primary Examiner* — Jay Morrison
(74) *Attorney, Agent, or Firm* — Joseph Kolodka

(57) ABSTRACT

Methods and systems for database migration from a multitenant database include taking a snapshot of an original database to be migrated with a hot backup process, such that the database is still capable of answering queries during the hot backup process; maintaining a query log of all queries to the tenant database after the hot backup process begins; initializing a new database at a target server using the snapshot; replaying the query log synchronize the new database with the original database; and answering new queries with the new database and not the original database.

9 Claims, 6 Drawing Sheets

(56) References Cited

PUBLICATIONS

Elmore, A., et al. "Zephyr: Live Migration in Shared Nothing Databases for Elastic Cloud Platforms" Proceedings of the 2011 international conference on Management of data (SIGMOD'11). Jun. 2011. pp. 301-312.

Liu, Z., et al. "Xen Live Migration With Slowed Scheduling Algorithm" The 11th International Conference on Parallel and Distributed Computing, Applications and Technologies. Dec. 2010. p. 215-221.

* cited by examiner

1

LATENCY-AWARE LIVE MIGRATION FOR MULTITENANT DATABASE PLATFORMS

RELATED APPLICATION INFORMATION

This application claims priority to provisional application Ser. No. 61/542,994 filed on Oct. 4, 2011, incorporated herein by reference. This application further claims priority to provisional application Ser. No. 61/543,012 filed on Oct. 4, 2011, incorporated herein by reference.

This application is related to application Ser. No. 13/645,112, entitled "SERVICE LEVEL AGREEMENT-AWARE MIGRATION FOR MULTITENANT DATABASE PLATFORMS," filed concurrently herewith and incorporated herein by reference.

BACKGROUND

1. Technical Field

The present invention relates to database migration and, in particular, to the migration of multitenant database platforms in such a way as to preserve tenant service level agreements.

2. Description of the Related Art

A method for migration from a multitenant database includes taking a snapshot of an original database to be migrated with a hot backup process, such that the database is still capable of answering queries during the hot backup process; maintaining a query log of all queries to the tenant database after the hot backup process begins; initializing a new database at a target server using the snapshot; replaying the query log synchronize the new database with the original database; and answering new queries with the new database and not the original database.

A multitenant database system is shown that includes a multitenant database configured to take a snapshot of an original tenant database to be migrated with a hot backup process, such that the original tenant database is still capable of answering queries during the hot backup process, to maintain a query log of all queries to the original tenant database using a processor after the hot backup process begins, to initialize a migrated tenant database using a received snapshot, and to replay a received query log to synchronize the migrated tenant database with an original tenant database.

Most existing database systems provide tools for data export/migration in a "stop and copy" fashion. Such a solution is not practical for migrating large amounts of data, where large downtimes will be incurred. Existing live migration solutions for database systems fail to take into account the costs that such a migration may cause to a provider.

SUMMARY

A method for migration from a multitenant database is shown that includes building an analytical model for each of a set of migration methods based on database characteristics; predicting performance of the set of migration methods using the respective analytical model with respect to tenant service level agreements (SLAs) and current and predicted tenant workloads, wherein said prediction includes a migration speed and an SLA violation severity; and selecting a best migration method from the set of migration methods according to the respective predicted migration speeds and SLA violation severities.

A multitenant database system is shown that includes a processor configured to build an analytical model for each of a set of migration methods based on database characteristics, to predict performance of the set of migration methods using the respective analytical model with respect to tenant service level agreements (SLAs) and current and predicted tenant workloads, wherein said prediction includes a migration speed and an SLA violation severity, and to select a best migration method from the set of migration methods according to the respective predicted migration speeds and SLA violation severities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A practical migration solution for multitenant database systems according to the present principles includes a minimum of downtime, controlled tenant interference, and automatic management. To achieve this, the present principles employ backup tools to perform a zero-downtime live backup of a database. Furthermore, "migration slack" is employed, referring to resources which can be used for migration without seriously impacting existing workloads. By taking query latency into account and monitoring system performance in real-time, system performance can be guaranteed according to tenant service level agreements (SLAs) even during the live migration.

The present principles achieve live migration by using existing hot backup functionality present in database systems. Because most contemporary database systems have such hot backup functions, the present principles may be employed without changes to existing database engines and operating systems. Within the bounds of SLA guarantees, the present principles use control-theory-based strategies to automatically throttle resource usage in the migration process to achieve the fastest possible migration that does not interfere with service level guarantees.

Figure 1:
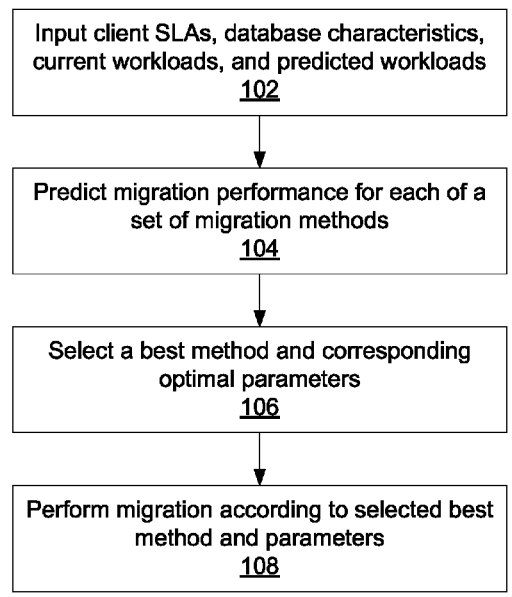
FIG. 1 is a block/flow diagram for migrating a database in a multitenant system according to the present principles.

Referring now in detail to the figures in which like numerals represent the same or similar elements and initially to FIG. 1, a high-level method for database migration is shown. At block 102, information regarding client SLAs, database characteristics, current workloads, and predicted workloads are entered as input. This information characterizes the database system as it will appear during migration, such that block 104 can predict how a migration will perform according to each of a set of migration methods. As an example, the set of migration methods may include a "stop and copy" method, while another method in the set may include a live database migration as described herein. Block 106 chooses a best method by selecting a method that will perform the migration in the shortest time without generating any SLA violations. If all migration methods tested in block 104 will generate SLA violations, then block 106 selects the migration method which generates the fewest violations. Block 106 further selects optimal migration parameters that correspond to the selected migration method. The migration method and parameters are employed in block 108 to migrate, e.g., a tenant from a first database system to a second database system.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments described herein may be entirely hardware, entirely software or including both hardware and software elements. In a preferred embodiment, the present invention is implemented in software, which includes but is not limited to firmware, resident software, microcode, etc.

Figure 2:
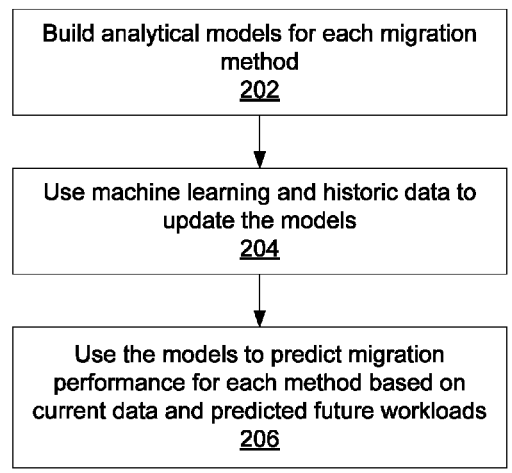
FIG. 2 is a block/flow diagram for predicting migration performance according to the present principles.

Referring now to FIG. 2, a method for modeling migration methods is shown. Block 202 builds an analytical model for each migration method to represent the resources consumed by that model. In the case of stop-and-copy, the analytical model may simply represent an amount of downtime proportional to the volume of data to be copied, using the characteristics of the database system to determine a maximum transfer rate. In the case of live migration, the analytical model may include a measurement of "migration slack," resources that may be used for migration without impacting SLA guarantees.

As an example of determining migration slack, consider a system where the resources available in a system R must reliably exceed the combined needs of each of the n tenant, such that $R \geq \Sum_{i=1}^{n} T_i$. If this relation does not hold, then the server becomes overloaded and begins incurring SLA violations. Migrating a tenant also consumes some resources—usually in disk input/output for reading or writing data, but also including processing overhead, network throughput, etc. If the server is handling m migrations, the resources needed to maintain SLA guarantees becomes $R \geq \Sum_{i=1}^{n} T_i + \Sum_{j=1}^{m} M_j$. Given the constant resource allocation R and a set of workloads T, it is now possible to allocate slack resources S without incurring violations, where $S = R - \Sum_{i=1}^{n} T_i$. While R remains fixed, the workloads T may change over time, such that the migration workloads M should be adjustable in realtime. Thus, it is often best to allocate resources below the slack value S to provide stability in tenant workload processing.

Block 204 uses machine learning and historic data to update the analytical models. Each model is then employed in block 206 to predict migration performance for each of the methods based on current data and predicted future workloads. This predicted performance includes the cost of SLA violations as well as migration costs such as resource usage and migration duration.

The machine learning (ML) models are used to predict the overhead cost of each migration method. For example, if the stop-and-copy method is chosen, then the ML model will look at the size of the files that need to be transferred (migrated) to the other server, the current network bandwidth, the IOPS (IO per second) that can be used for the transfer, etc. The output of the ML model is a prediction on the overhead cost of migration, such as the duration of the migration (e.g., 10 minutes) or the number of queries that are dropped during the migration (because during stop-and-copy migration, the server will be shut down).

As another example, if live migration is used, then the ML model may look at the same (or somewhat different) set of characteristics of the system, make a prediction on the migration overhead, e.g., in terms of the duration of the migration and the impact of the migration process on the query latency among all tenants on the current server. Then, based on the predictions, an appropriate (lower cost) migration method is chosen.

ML methods have two stages: a training stage and a testing stage. During the training stage, which is usually done offline, historic data are used to learn a prediction model, such as the linear regression model. During the testing stage, which is usually done online, the prediction is made based on realtime data and the model trained offline. According to the present principles, the predictive models are constantly updated by incorporating real-time data into historic data and by repeating the training stage of machine learning methods in real time. In other words, the ML model is updated (trained again) whenever new data is available. Such real-time updates can improve the model over time.

Figure 3:
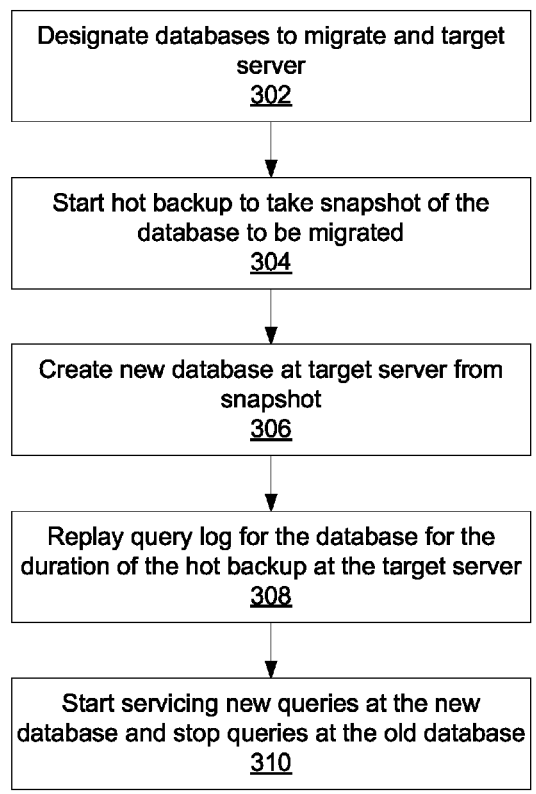
FIG. 3 is a block/flow diagram for migrating a database in a multitenant system according to the present principles.

Referring now to FIG. 3, a method for live migration is provided that allows maintenance of SLA guarantees. Block 302 designates the database or databases to be migrated and selects a target server for the migration(s). Block 304 starts a hot backup of the databases to be migrated, creating a snapshot of each database. Each snapshot is transferred to its respective target server, and block 306 creates a new database from each snapshot at its respective target server. Block 308 transfers the query log that accumulated during the hot backup to the target server and replays the query log to synchronize the new database with the state of the old database. Block 310 then starts servicing queries at the new database and stops queries at the old database. At this point the old database may be purged, freeing resources at the originating server.

Figure 4:
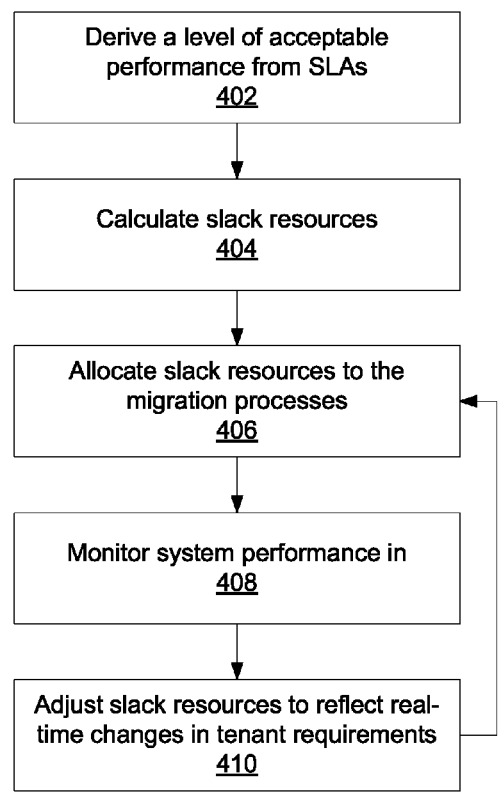
FIG. 4 is a block/flow diagram for throttling migration speed according to the present principles.

Referring now to FIG. 4, a method for allocating resources to migration processes $M_j$ is shown. Block 402 derives an acceptable performance level based on existing SLAs. Based on this acceptable performance level, block 404 calculates slack resources. This may be performed using the formulas for S shown above. Block 406 allocates slack resources to migration processes $M_j$. Block 408 monitors the system during migration to track changes in tenant workloads $T_i$. Block 410 adjusts the slack resources accordingly—as tenant workloads increase, slack resources will decrease and vice versa. Processing loops back to block 406 to allocate an appropriate number of resources to the migration processes and continues to loop in this manner until the migration has completed.

Figure 5:
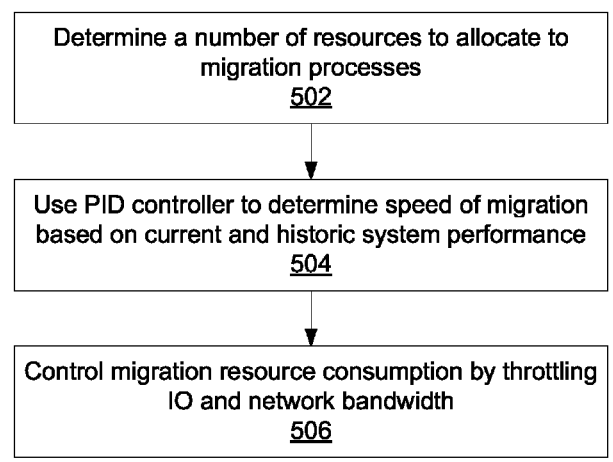
FIG. 5 is a block/flow diagram for throttling migration speed according to the present principles.

Referring now to FIG. 5, a method for controlling the migration process is shown, allowing for adaptive throttling of the migration processes in response to changing resource availability. Block 502 determines available slack resources that may be employed in migration, as described above. Block 504 uses a proportional-integral-derivative (PID) controller to determine a speed of migration based on system performance. The PID controller is used to adjust system resource consumption of the migration process in block 506 by throttling disk input/output (I/O) and network bandwidth. As slack resources become available, additional resources are allocated to migration to speed the process. As tenant workloads increase and fewer resources are available, resources are taken away from the migration process to preserve SLA guarantees. Examples of throttling embodiments may include using the Linux "pv" utility to limit the amount of data passing through a given pipe. This effectively limits both CPU as well as I/O (both disk and network), because the backup process will only process the database as quickly as the "pv" utility will allow.

A PID controller is a tool in control theory for driving a system actuator such that the system stabilizes around a particular setpoint. At a high level, a PID controller operates as a continuous feedback loop that, at each timestep, adjusts the output variable (the actuator) such that a dependent variable (the process variable) converges toward a desired value (the setpoint value).

Figure 6:
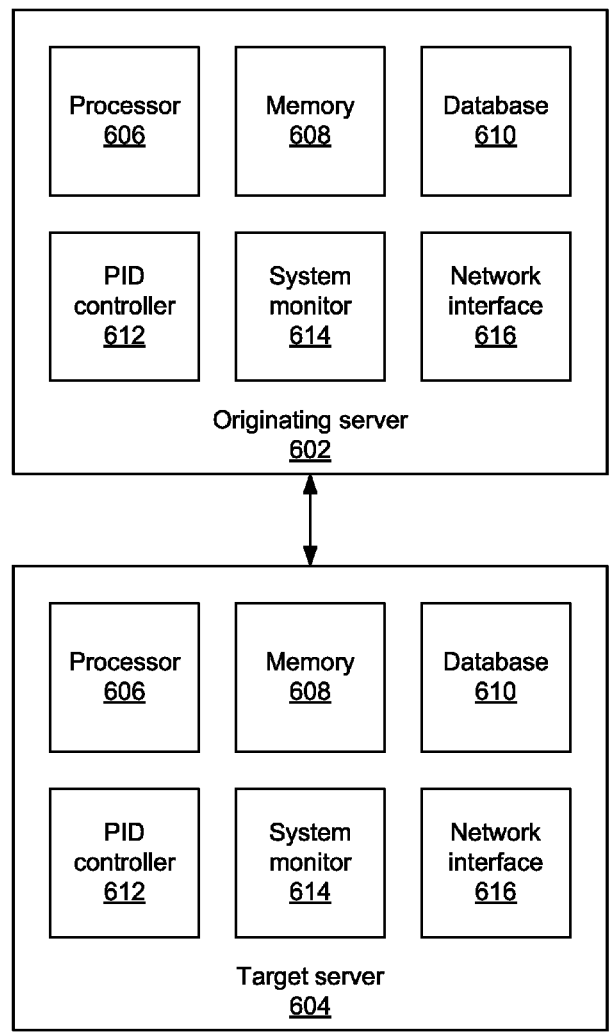
FIG. 6 is a diagram of a migration of databases between multitenant systems according to the present principles.

Referring now to FIG. 6, a system of database servers is shown that includes an originating server 602 and a target server 604. Each server includes a processor 606, a memory storage unit 608 (including one or more of random access memory and non-volatile storage), a multitenant database system 610, a PID controller 612, and a system monitor 614. The multitenant database system 610 at the originating server 602 includes one or more tenant databases that are to be migrated to the target server 604. System monitors 614 tracks the resources being used at each server 602/604, providing PID controller 612 and processor 606 with information regarding processor usage, memory usage, and network usage.

Figure 7:
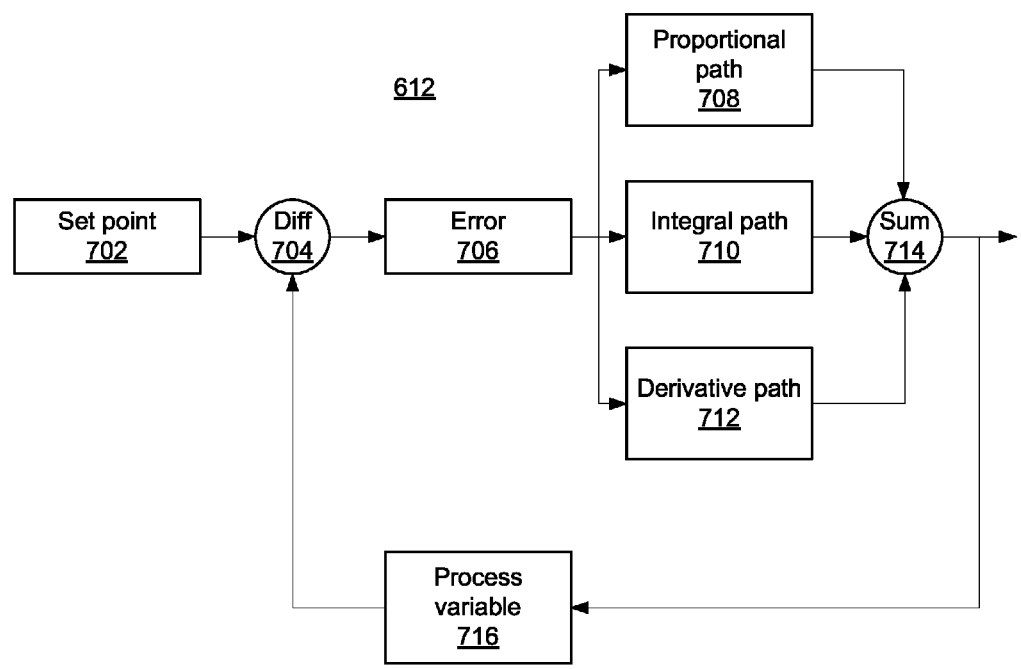
FIG. 7 is a diagram of a proportional-integral-derivative controller according to the present principles.

Referring now to FIG. 7, greater detail on the PID controller 612 is provided. At a high level, a PID controller 612 operates as a continuous feedback loop that, at each timestep, adjusts the output such that a dependent variable (the process variable 716) converges toward a desired value (the set point value 702). At each timestep, the current process variable 716 is compared to the desired setpoint 702. The new output of the controller 612 is determined by three component paths of the error 706, defined as the degree to which the process variable 716 differs from the setpoint 702 at comparator 704. The three paths are the proportional path 708, the integral path 710, and the derivative path 712. Each path is scaled by coefficients $K_p$, $K_i$, and $K_d$ respectively. In general terms, the proportional path 708 uses the current error 706, the integral path 710 uses past errors, and the derivative path 712 predicts furutre error. The outputs of the paths are added at summer 714. The output at time t with error e(t) is given by the formula:

$$\text{output}(t) = K_p e(t) + K_i \int_0^t e(\tau)\,d\tau + K_d \frac{d e(t)}{d t}.$$

The PID controller 612 is in charge of determining the proper migration speed, so the output variable is used as the throttling speed adjustment (either speeding up or slowing down the migration). For the process variable and setpoint, one option is to target available slack using a setpoint of zero unused slack. However, to save on computation, current transaction latency may be used as an indicator of available slack. As migration speed increases, the total server load also increases. As long as the migration remains under the available slack, average transaction latency will increase only modestly as migration speed increases. However, as the slack runs out, latency will begin to display more significant increases. Thus, to ensure that slack is used without exceeding available resources, the PID controller 612 may be configured to target a given average transaction latency. The process variable 716 may therefore be set to the current average transaction latency and the setpoint 702 may be set to a target latency. This setpoint 702 represents an efficient use of available slack while still maintaining acceptable query performance. The three parameters of the different pats, $K_p$, $K_i$, and $K_d$, may be tuned manually. A small $K_i$ and a large $K_d$ are used to set a reaction speed to changes in migration speed to prevent overshooting the optimal speed, allowing the overall latency to stabilize.

Having described preferred embodiments of a system and method for latency-aware live migration for multitenant database platforms (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

1 Introduction

Modern cloud platforms are designed with the aim of compactly servicing many users on a large number of machines. At the lowest level, cloud providers may simply lease raw machine time to customers (Infrastructure as a Service), or may provide a ready-to-use stack on top of the underlying hardware to customers (Platform as a Service). Cloud platforms are targeted not only to large customers requiring vast computing resources but also to smaller customers that do not require the full resources of even a single server. To increase resource utilization in the presence of smaller customers, providers employ multitenancy, in which multiple users or applications (server 'tenants') are collocated on a single server. Multitenancy is attractive both to the cloud provider, who is able to serve more customers with a smaller set of machines, and to customers, who do not need to pay for the full capacity of a server. Ideally, each tenant on a multitenant server is both unaware and unaffected by other tenants operating on the machine, and is afforded the same high performance it would receive on a dedicated server.

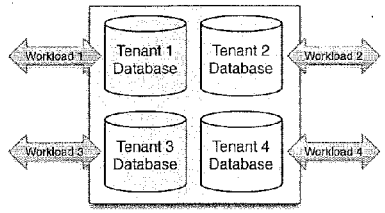

Figure 1: A multitenant database server with 4 tenants.

1.1 Database Multitenancy

Database multitenancy is of particular interest due to the ubiquity of database-oriented applications. Nearly all web applications, analytic applications, or other types of data-intensive applications interact heavily with a database, which makes provisioning multitenant servers specifically for databases particularly attractive. A multitenant database server is essentially a specialized type of multitenant server in which all tenants are operating database applications on the server (typically interacting with other servers running application logic). This stands in contrast to other multitenancy approaches, such as provisioning a virtual machine (VM) for each tenant in which to run applications, which impose higher overhead. An example multitenant database server is depicted in Figure 1.

1.2 Service Level Agreements

Database multitenancy introduces its own challenges. In order to maximize profits, providers wish to pack many tenants onto each server. On the other hand, tenants wish to be guaranteed a certain level of performance, typically as specified by service level agreements (SLAs). An SLA may specify metrics of guaranteed service, such as system uptime and query latency. From the service provider point of view, these competing goals (packing many tenants and satisfying the SLAs) must be balanced against each other given the resources of the multitenant server.

Each tenant database imposes a resource footprint, consisting both of data (e.g., the size of the database) as well as a workload (e.g., queries per second). The resource footprint of each tenant is dynamic — data may be added or deleted, and the amount of load imposed by the tenant may change over time. This can lead to resource hotspots such as shown in Figure 2, where a previously stable server becomes overloaded and begins incurring SLA violations. Such a situation is undesirable both to the provider (who pays a monetary penalty) and to the tenant (who experiences unacceptable performance degradation). Additionally, it is important to note that violations may occur not only for the problematic tenant but for other tenants on the server as well, who may begin experiencing problems even they do not have any workload changes themselves.

1.3 Database Migration

To prevent a system overload as shown in Figure 2c from happening, a practical solution is to proactively move one or more tenants to another machine, once tenant workload changes are detected (Figure 2b). Such a technique is called database migration, and refers to entirely relocating the tenant to an alternate machine. Database migration can be used not only to alleviate hotspots on a heavily loaded machine but also to consolidate multiple tenants onto a relatively idle server, thereby freeing extra servers that may be shut down or re-purposed for other uses.

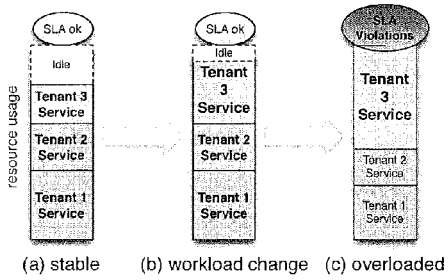

(a) stable    (b) workload change    (c) overloaded

Figure 2: SLA violations due to dynamic workloads: (a) a stable multitenant database server, (b) a tenant's workload changes, and (c) the server becomes overloaded.

However, the benefits of migration come with several costs. Assuming a conventional shared-nothing architecture [10] (in which each machine has one or more dedicated disks), the unavoidable cost is that of copying the tenant's data to the target machine. In addition, migration has other costs such as SLA-related costs (e.g., SLA penalty due to system downtime and unacceptable query latency) and human-related costs (e.g., costs for experienced DBAs). Therefore, in order to minimize these costs, a database migration solution must make judicious decisions such as when to migrate, which tenant to migrate, where to migrate, and finally how to migrate. In this paper, we focus on the final question: how to migrate databases in an efficient way.

We believe a practical migration solution for multitenant database systems should achieve the following objectives:

Zero System Downtime. If the migration requires shutting down the server before moving it, then all queries routed to the migrating tenant will be either significantly delayed or lost. This is clearly undesirable to the migrating tenant.

Controlled Tenant Interference. The resource overhead of migration (such as reading from disk, consuming network bandwidth, and processing overhead) may have a negative impact on the rest of the tenants, even if a hotspot did not exist beforehand. This possibility is depicted in Figure 3, in which processing the migration itself creates a hotspot and therefore tenant SLA violations. This impact must be controlled so as to remain within acceptable limits.

Minimum Human Intervention. The migration should be both fast and automatically managed. Human intervention is both costly and less responsive to changing system conditions during migration than an automated system.

1.4 Contributions

In this paper, we present Slacker, a system for performing rapid database migrations in such a way that minimizes the costs of migration mentioned above, namely, system downtime, tenant interference, and human intervention. Slacker is a component of our comprehensive data management platform for the cloud, CloudDB [11, 23]. Our primary contributions are fourfold:

1. We present and evaluate a technique for performing live (zero-downtime) database migration using standard database backup tools. While other techniques for live database migration

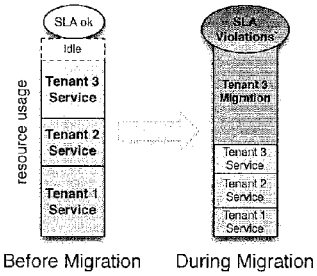

Figure 3: A hotspot caused by migration.

have been proposed [8, 10], our approach is unique in that it operates on off-the-shelf database systems using readily available open-source tools. Our approach does not require modifications in the database engine and can be implemented completely outside of a database product.

2. We present the idea of 'migration slack', which refers to resources that can be used for migration without seriously impacting workloads already present on the database server. We demonstrate the existence of this slack and show how it can be used to minimize interference through the use of migration throttling.

3. We present an automated algorithm for performing the live migrations in Slacker within available migration slack. Our approach is based on the use of a PID controller and represents a novel application of control theory to this domain. We demonstrate the efficacy of this approach in Slacker and show that it is effective in managing migrations in a wide variety of scenarios.

4. We present a full prototype implementation and experimental evaluation of our end-to-end system. We demonstrate that our system maintains database query latencies within 10% of the designated target, while achieving higher overall migration speeds than naive migrations at equivalent latencies.

The rest of the paper is organized as follows. In Section 2, we present the architecture and building blocks in Slacker. In Section 3, we demonstrate the existence of migration slack, and discuss the use of throttling to perform migrations with minimal interference. In Section 4, we apply control theory to the idea of migration slack to present an algorithm for efficiently performing migrations using available slack within the Slacker framework. An evaluation of our approach is presented in Section 5, parameters and natural extensions are discussed in Section 6, related work is summarized in Section 7, and we conclude in Section 8.

2 Slacker Architecture

Slacker is implemented as a middleware that sits atop one or more MySQL tenants. Each server running an instance of Slacker operates a single server-wide migration controller that migrates MySQL instances on the server between other servers running Slacker. In addition to migrating existing tenants, the middleware is also responsible for instantiating (or deleting) MySQL instances for new tenants. Each Slacker node operates in an autonomous fashion and only communicates

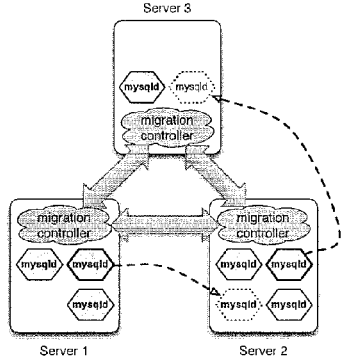

Figure 4: The Slacker architecture.

with other nodes for the purpose of migrating tenants. An example Slacker cluster with three nodes is depicted in Figure 4.

2.1 Database Backend

Slacker interacts with MySQL backend databases using InnoDB tables. Our multitenancy model is process-level — that is, each tenant collocated on the server is provided a dedicated MySQL daemon listening on a dedicated port. Each tenant has full control over its daemon and is free to create arbitrary databases, tables, and users. Adding a tenant creates a new data directory containing all MySQL data, including table data, logs, and configuration files. Similarly, deleting a tenant simply stops the server process and deletes the tenant's data directory. From Slacker's perspective, each tenant is simply a directory containing all data and a corresponding MySQL process. Slacker is transparent to tenants, who need not be aware of Slacker at all and simply interact directly with their MySQL server on the assigned port.

Our choice of process-level multitenancy rather than a single, consolidated database server (housing all tenants) has two primary advantages. The first is increased isolation between tenants, since each database server treats its tenant on a best-effort basis. This prevents situations such as buffer page evictions due to competing workloads — we avoid any situations in which buffer allocations overlap by never overprovisioning memory. The second is ease of engineering, since resources belonging to each tenant are cleanly separated on the server. These advantages come at the cost of modest per-tenant memory overhead and decreased maximum throughput relative to a consolidated DBMS [6]. However, we consider such a tradeoff worthwhile, since the flexibility in database migration is our main focus. We discuss other multitenancy levels in Section 6.

2.2 Tenant Management

Slacker itself is implemented as a Java framework to create, delete, and migrate database tenants. The migration controller on each server monitors all tenants located on the machine and manages any in-progress migrations. Tenants are represented by globally-unique numeric IDs, which are used to issue commands to Slacker (such as 'migrate tenant 5 to server XYZ'). Communication between Slacker migration controllers occurs in a peer-to-peer fashion using a simple format based on Google's protocol buffers [17]. Migrations are performed on-demand by connecting to another control node and initiating the migration of a specific tenant.

For customer applications, communication with a specific tenant database requires only knowledge of the machine on which the tenant is located and the tenant ID, since the database port is a fixed function of the ID. This approach is only problematic after a migration is performed, since the tenant no longer resides on the original server. This issue can be resolved cleanly by issuing an ARP packet advertising a new IP address (as in [12]) — in our prototype, we simply resolve the issue by adding a lightweight frontend server that maintains an up-to-date mapping of tenants to servers. Machines issuing queries to a given tenant register with the frontend to receive updates when the tenant migrates.

2.3 Migration Framework

Slacker provides two forms of migration. The first is a standard 'stop-and-copy' migration, while the second is a live migration making use of live backup tools. We overview each method below.

2.3.1 Stop-and-Copy

Stop-and-copy is the simplest form of migration, and simply consists of shutting the database server down (or otherwise freezing it, as with a global read lock), copying the data to the target source, and restarting it. For MySQL, one way to do this is by exporting all data with a tool like `mysqldump`, copying the resulting file, and importing it into the target server. This approach is very slow, however, largely due to the overhead of reimporting the data [9]. In Slacker, we avoid this by taking advantage of per-process multitenancy, which cleanly separates the data files for each tenant. To perform a stop-and-copy, Slacker simply acquires a read lock on the tenant database, performs a file-level copy of the tenant data directory to the target machine, then starts a new MySQL instance on the target server pointing to the copied data directory. Since the data stays in the internal format used by MySQL, no importing or exporting overhead is involved in this approach (the same approach has also been applied at the level of virtual machine disks, such as in [4]). Once the new server is running, it is immediately up-to-date (since no write queries have executed on the source in the meantime) and begins handling the tenant workload, while the source tenant may be deleted.

The obvious downside of stop-and-copy is the downtime resulting from stopping the server. As verified in our own experimentation, the length of this period is proportional to the database size, and during this period, no queries (or at least, no queries that modify the data) may be executed against the database. Due to this serious limitation, we do not further consider the stop-and-copy solution here.

2.3.2 Live Migration

In comparison with stop-and-copy, live migration performs the migration without interrupting the server, allowing it to continue serving clients while the migrations proceeds. To implement live migration in Slacker, we make use of Percona XtraBackup [25], which is an extended, open-source version of the commercial MySQL Enterprise Backup program. Mainly for the purpose of hot backup, XtraBackup produces a consistent-in-time snapshot of the database without interrupting transaction processing. Slacker leverages this hot backup function to obtain a consistent snapshot for use in starting a new MySQL instance.

Note that while our prototype is specific to MySQL (via XtraBackup), equivalent hot backup functionality exists in most modern databases, such as Tablespace Hot Backup in Oracle and similar functions in Microsoft SQL Server and PostgreSQL. These tools could easily be used to implement Slacker for another DBMS, as our design has minimal requirements of the backup tool besides liveness.

Migration in Slacker is performed in three steps. In the initial *snapshot transferring* step, Slacker streams the snapshot generated by XtraBackup to the target server on-the-fly, then prepares the snapshot on the target while the source continues to service queries. During preparation, XtraBackup applies crash recovery against the copied data.

Due to the time spent preparing the snapshot, once the target server is running, it may be somewhat behind the still authoritative source server. To handle this, in the *delta updating* step, Slacker applies several 'rounds' of deltas from the source to the target by reading from the MySQL binary query log of the source tenant. Each delta brings the target up-to-date at the point where the delta began executing, then the subsequent delta handles queries executed during the application of the previous delta.

Once deltas are sufficiently small, in the *handover* step, a very brief (well under 1 second in all experiments) freeze-and-handover is performed in which the source is frozen, the final delta is copied, and the target becomes the new authoritative tenant. It is worth mentioning that XtraBackup can perform its own deltas during snapshotting — our own snapshots are only employed to avoid downtime while the snapshotted tenant is prepared for use on the target server.

Our snapshot-delta-handover approach is similar to the VM migration technique employed in [12], which also discusses some edge cases such as workloads with very high write turnover. Their solutions to these issues equally apply to migrations in Slacker.

In practice, applying deltas usually represents only a very small portion (a few seconds) of the entire migration process. In the following, we focus on the initial snapshot transfer, which is by a large margin the most time-consuming step in Slacker.

3 Migration Slack

Database servers have a finite amount of resources with which to serve queries. In a multitenant database server, available resources are shared among all tenants on the server. Furthermore, resources must be sufficient for tenants to achieve their SLA guarantees (such as certain percentile latencies; e.g., the 95th percentile of queries has a max latency of 1 second). Assume a physical server has fixed resources $R$ and is servicing $n$ tenant workloads consuming resources $T = \{T_1, T_2, \ldots, T_n\}$. Assume that there exists a resource usage threshold $R_0$, where $R_0 \leq R$, such that for the server to reliably satisfy its SLA, it must be the case that:

$$f(T_1, \ldots, T_n) \leq R_0, \quad (1)$$

where $f()$ is the function that maps the resource usage of all the tenants to the total resource usage.

If this does not hold, then the server is overloaded and will begin incurring SLA violations (resulting in dissatisfied customers and costs to the cloud provider). Migration can be used as a tool for distributing all tenants between servers such that Equation (1) holds. A migration process involving the server (either an incoming or an outgoing tenant) adds an extra workload — largely disk I/O for reading or writing data, but also including processing overhead, network throughput, and so forth. If the server is handling a migration process with corresponding workload $M$, then we require the following:

$$f(T_1, \ldots, T_n, M) \leq R_0. \quad (2)$$

That is, the additional migration process should not bring the server to an overloaded condition.

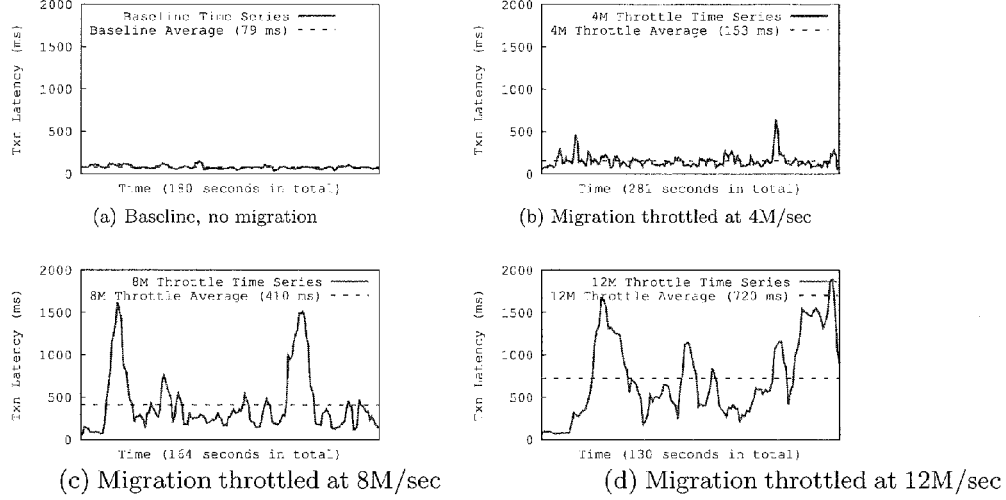

Figure 5: Transaction latency over time with no migrations (a) and under different migration rates (b)-(d).

Finally, given the constant resource allocation $R_0$ and a set of point-in-time workloads $T$, we can define the current migration slack $S$ as the resources we can allocate to migration *without incurring violations*:

$$S = \underset{m}{\mathrm{argmax}}\{s.t.\ f(T_1,\ldots,T_n, M = m) \leq R_0\}. \tag{3}$$

As a simplified but illustrative example, assume CPU is the critical resource and that CPU usage is additive (i.e., $f(T_1,\ldots,T_n,M) = \sum_{i=1}^{n} T_i + M$), which has been observed in previous studies [7]. Then we have for the migration slack $$S = R_0 - \sum_{i=1}^{n} T_i. \tag{4}$$

There are many challenging issues in measuring migration slack, such as identification of the critical resource, monitoring of that resource, and derivation of the resource usage model (specifying the $f()$ function). Fortunately, it turns out that we do not have to *explicitly* identify and model the slack. Since we mainly care about the impact of the migration on system performance (e.g., query latency), we can *indirectly* observe and exploit available slack.

3.1 Migration Throttling

We illustrate the slack by showing the system performance under different migration rates. The technique we use to control $M$ (the cost of each migration) is throttling, or limiting the rate of transfer. Since the majority of the resource cost in migration is from reading, writing, or sending a large amount of data (roughly equal to the size of the database), we can effectively limit the workload of a migration by simply limiting the rate of data transfer.

In Slacker, we implement throttling by employing the Linux utility pv, which allows for limiting the amount of data passing through a Unix pipe. To throttle a live migration, we stream the output of XtraBackup (the database snapshot) into a pv process that limits the transfer rate appropriately, before passing the stream to the nc utility (or ssh if security is desired), which actually transfers the data across the network to the target machine. Since XtraBackup only processes the database as quickly as allowed by pv, this strategy effectively limits the resource usage of both CPU and I/O (both network and disk). Finally, pv allows for changing the throttling rate of an existing process, which allows us to dynamically change the throttling speed on a second or even sub-second level granularity.

3.2 Slack Case Study

Here we present a case study that demonstrates both the existence of migration slack as well as the ability of throttling to exploit it. Our performance focus is transaction-level latency, which is a common SLA metric in real systems [21]. We examine a fundamental case — a server with a single tenant and client workload, running a migration of that tenant to a second server. The workload consists of a mix of read and write queries against a 1 GB database — we defer a more thorough discussion of our benchmark and experimentation framework to Section 5.

First we execute the workload against the tenant without any migration — this provides us with a baseline performance measure. A time series of transaction latencies (averaged over a sliding 3 second window to provide modest smoothing) is shown in Figure 5a. The baseline latency fluctuates around a mean of 79 ms, mostly depending on the amount of disk I/O that transactions are incurring vs the number of cache hits. However, it is clear from the overall trajectory that latency is flat and that performance is stable around the average latency.

Next, we rerun the experiment while simultaneously migrating the tenant and observe how its performance changes. Using Slacker, we perform a live migration to a second machine and throttle the transfer speed, first to 4 MB/sec. While performing the migration, we execute the same workload against the migrating tenant as before. The results of this run are shown in Figure 5b. Average latency increases modestly from 79 ms to 153 ms, but remains stable overall. For example, despite the brief latency blips present, this run satisfies an SLA specifying a max 500 ms latency in the 99th percentile. Thus, with such an SLA, we can say that this migration speed is below the available migration slack.

Next, we increase the migration speed to 8 MB/sec and repeat the experiment, the results of which are shown in Figure 5c. Average latency again increases from 153 ms to 410 ms, and the magnitude of the brief latency peaks again increases, but latency is still fairly stable overall. As before, whether this new speed falls within available slack depends on the application SLA. For example, while this no longer satisfies the more restrictive 500 ms, 99th percentile SLA mentioned in the 4 MB case, a slightly relaxed SLA such as 1000 ms latency in the 90th percentile is still satisfied.

If we increase the speed yet again to 12 MB/sec, the same trends continue. As shown in Figure 5d, average latency again increases significantly to 720 ms, but even more notable are the large peaks and valleys, which swing between 200 ms and upwards of 1500 ms multiple times during the roughly 2 minute migration. At this migration speed, the total resource usage is very close to the server capacity, resulting in a query backlog during short-lived traffic bursts that recovers during the relatively idle periods between bursts.

Finally, we increase the speed once more to 16 MB/sec. As seen in Figure 6, this migration speed results in an over-capacity server that can no longer handle the steady-state query load over time. As a result, transactions queue faster than they can be serviced, causing latency to continuously increase until migration completes. This is a definitive sign that slack is exceeded, and violations

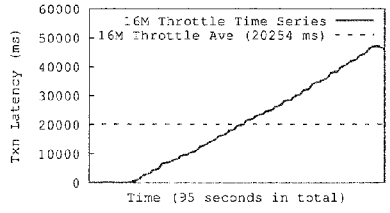

Figure 6: Transaction latency with a 16 MB/sec migration.

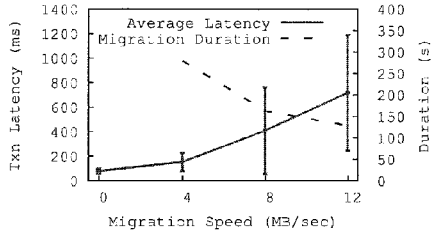

Figure 7: Trading off migration speed and workload performance while still (depending on SLA) within slack.

are guaranteed to occur under any reasonable SLA.

3.3 Slack Tradeoffs

As demonstrated in the previous section, it is straightforward to identify an upper bound on the resource allocation that can be dedicated to migrations — this is the point at which latency steadily increases, indicating that the database is overloaded and cannot maintain both its workloads and migrations. However, as previously discussed, this is not necessarily the slack that should be used, since remaining under this limit presents a tradeoff between migration speed and transaction performance, including both average latency and latency stability. This tradeoff is demonstrated in Figure 7, which plots the average transaction latency and standard deviation of Figures 5a through 5d. This underscores the conclusion that increasing the migration speed increases both average latency and latency instability.

As a summary, in the previous case study, we presented a set of experiments demonstrating the existence of migration slack using throttling. We observe that increasing migration speed via throttling significantly increases the demand on the server, resulting in decreased database performance. Above a certain migration speed, the server is overloaded and latency becomes unbounded (a hard upper bound on slack). Beneath this threshold, determining actual slack to be exploited presents a tradeoff between migration speed and database performance, both in terms of average transaction latency and the stability of this latency. The particular requirements of an SLA (e.g., acceptable latency levels) must be considered when determining the 'optimal' level of slack to exploit for migration.

However, note that while the total resource capacity $R_0$ is fixed, $T$ is not since tenant workloads may change over time, even during the process of migration. This means that in order to maintain Equation (2), *we must be able to adjust $M$ on-the-fly*. The method of adjusting $M$ is a key component of Slacker and is discussed below.

4 Adaptive Dynamic Throttling

Here we apply the idea of migration slack to performing actual migrations in Slacker. We do so with the use of an automated, dynamic throttle, which allows us to (a) determine the speed of migration appropriate to the level of slack, and (b) adjust the speed of migration as the level of slack changes in real time. Control of the migration speed is managed by a proportional-integral-derivative controller (or PID controller), which is a widely-known feedback mechanism in control theory. We detail our controller design in this section and evaluate its performance within Slacker in Section 5.

4.1 Dynamic Throttling

The workload evaluated in Section 3 was effectively static — as a result, the migration slack was also static. However, real workloads are rarely static, where there may be both long-term shifts and short-term bursts. Example causes of dynamic workloads include: day-to-day traffic patterns, e.g., diurnal periods of high activity (long-term), flash crowds resulting in a rapid increase and subsequent decrease in database traffic (short-term), increased background workload due to an incoming tenant migration or newly added tenant database (both short-term and long-term).

A well-chosen fixed throttle is a sound approach for a static workload. However, for a dynamic workload, any optimal migration speed may become suboptimal in the long term. If the server workload increases, the previous throttling speed may exceed the new level of slack, while if the server workload decreases, the migration may take longer to complete than necessary. Similarly, short-term burst during the duration of a migration process may render a pre-fixed migration speed inappropriate.

Our solution to this issue is using a dynamic throttle rather than a fixed throttle. By adjusting the migration speed on-the-fly, we can follow a changing level of migration slack while maintaining both high overall migration speed and consistent workload performance.

4.2 Throttle Control

Given the ability to dynamically vary the throttle, we still need a technique to actually set and adjust the throttle appropriately. Furthermore, it is important this technique be as automated as possible — that is, we do not want to require an operator such as a database administrator to manually control the migration speed. For controlling the throttle speed, we employ an automated technique based on a proportional-integral-derivative (PID) controller.

4.2.1 PID Controller Overview

A PID controller [13] is a well-known algorithm in control theory for driving a system actuator such that the system stabilizes around a particular setpoint. At a high level, a PID controller operates as a continuous feedback loop that, at each timestep, adjusts the *output variable* (the actuator) such that a dependent variable (the *process variable*) converges towards a desired value (the *setpoint* value). A simple example of a PID controller application is maintaining the temperature in a room. In such a scenario, the output variable is the amount of heat applied (e.g., run a heater at 25% or 50% strength), the process variable is the current room temperature (e.g., 65 °F), and the setpoint is the desired room temperature (e.g., 70 °F).

A block diagram of a PID controller is shown in the dashed box in Figure 8. At each timestep, the current process variable is compared against the desired setpoint. The new output of the controller is determined by three components of the error (the degree to which the process variable does not

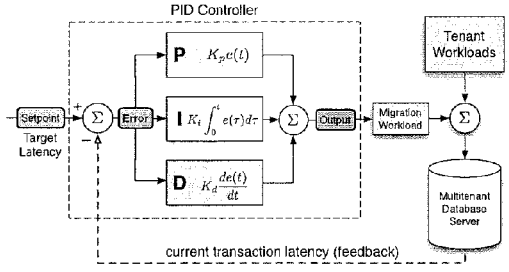

Figure 8: The architecture of the PID controller based dynamic migration in Slacker.

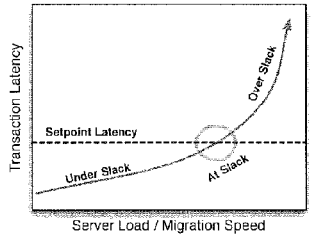

Figure 9: Consuming slack with a PID controller.

match the setpoint): a proportional, integral, and derivative component (scaled by parameters $K_p$, $K_i$, and $K_d$, respectively). Roughly speaking, P corresponds to the current error, I corresponds to the past error, and D corresponds to the predicted future error. The output of the controller at time $t$ with error $e$ is given by the sum of the three components:

$$out(t) = K_p e(t) + K_i \int_0^t e(\tau)d\tau + K_d \overline{\frac{de(t)}{dt}} \tag{5}$$

The design, behavior, and tuning of general PID controllers is a broad area in itself — we mention several relevant references in Section 7.

4.2.2 PID Controller for Migration

We apply a PID controller to the problem of database migration in the following way (illustrated in Figure 8). As discussed previously, the controller is in charge of determining the proper migration speed, so the output variable is the throttling speed adjustment (either speeding up or slowing down). For the process variable and setpoint, one approach could be to target available slack (e.g., a setpoint of zero unused slack). However, this approach would require calculating slack directly, a nontrivial problem in itself. Instead, we use current transaction latency as a indicator of available slack. The intuition behind this is as follows. As we increase the migration speed, the total server load similarly increases. So long as the migration remains under the available slack, average transaction latency will increase only modestly as the migration speed increases. However, around the point at which all slack is being used, latency will begin to display more significant increases. If we increase migration speed past this, slack will be exceeded and latency will increase very rapidly.

Thus, in order to ensure that we are using most slack without exceeding it, we configure our PID controller to target a certain average transaction latency. As shown in Figure 9, the process variable is the current average transaction latency, and the setpoint is the target latency. The setpoint indicates an efficient use of available slack while still maintaining acceptable query performance. Thus, the behavior of the PID controller is to ramp up the speed of migration until transaction latency is close to the setpoint, then maintain that latency over time by adjusting the throttling speed as necessary. In other words, using the illustration in Figure 9, we observe the transaction latency (the $y$ value) and try to stay in the acceptable region (along the red curve while staying within the green circle), which is achieved by dynamically controlling the migration speed (the $x$ value).

The controller will avoid migrating so fast as to cause unacceptable performance (as determined by the setpoint), but will aggressively migrate as fast as possible so long as the current level of performance is within acceptable levels. Of course, the efficacy of this approach depends heavily on a suitable setpoint setting. More specifically, the setpoint must be high enough to consume most available slack, but low enough to maintain reasonable performance. We present experiments demonstrating the importance and effects of the setpoint in Section 5.

4.2.3 PID Controller Implementation

We implement the controller design shown in Figure 8 in Slacker to manage migration speeds. The input to the controller at each timestep consists of the current average transaction latency over a small sliding window of time. The size of the sliding window provides some useful smoothing to stabilize the controller input, since individual transaction latencies can vary significantly. We empirically found 3 seconds to be a reasonable window size, with a 1 second timestep. In other words, once every second, the controller is given the average transaction latency over the past 3 seconds (this is the current 'process variable' value) and outputs the new throttling speed as a percentage of the maximum possible throttling speed.

Since the integral component of the controller takes past error into account, problems can occur if the process variable is far from the setpoint for an extended period. This can easily happen in Slacker if the server is not heavily loaded to begin with — it may be the case that, even running the migration at full speed, transaction latencies stay well under the setpoint. We prevent an accumulation of past error (known as 'integral windup') by employing a PID velocity algorithm — this is an alternative form of the classical algorithm that outputs a delta rather than an absolute value at each timestep and does not use a sum of past errors, thus avoiding integral windup.

We manually tune the three parameters of the controller scaling the three error components ($K_p$, $K_i$, and $K_d$ in Equation 5). We found that relative to $K_p$, $K_i$ needed to be relatively small and $K_d$ relatively large owing to the slow reaction speed of transaction latency to a change in the migration speed. A larger $K_d$ and smaller $K_i$ serve to both slow the rate of change in the migration speed and help prevent overshooting the 'correct' speed, stabilizing the overall latency and reducing the degree of oscillations.

5 Evaluation

We evaluate the performance of Slacker using our dynamic throttling technique on a live testbed. We have three primary migration objectives:

1. Workload performance. First, we want Slacker to maintain acceptable workload latencies while performing simultaneous migrations. In the context of Slacker's dynamic throttling,

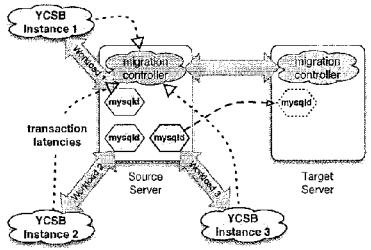

Figure 10: The Slacker/YCSB evaluation framework.

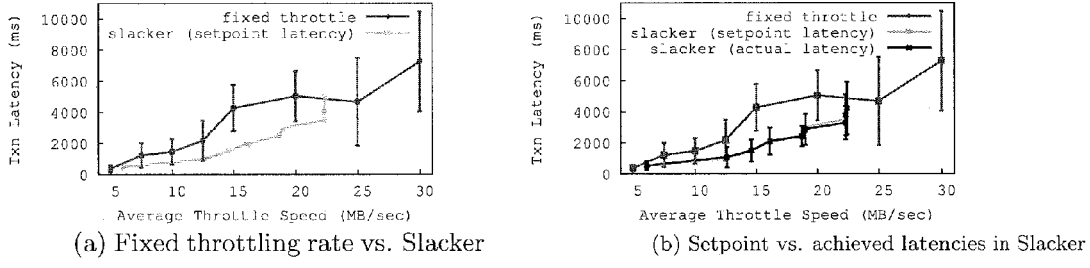

(a) Fixed throttling rate vs. Slacker (b) Setpoint vs. achieved latencies in Slacker Figure 11: (a) Latency with varying fixed throttling rate vs. dynamic migration speed with varying setpoints and (b) achieved latencies compared to setpoint latencies.

this means that latencies do not significantly exceed the setpoint latency.

2. Migration speed. Second, we want Slacker to achieve a high migration speed by making efficient use of available migration slack. However, this should be subject to (1), so that we minimally impact workload performance.

3. Flexibility. Finally, we want Slacker to gracefully handle a dynamic workload. We should be able to quickly and efficiently adapt to a new workload environment without significantly degrading (1) or (2).

To compare dynamic migrations with a simpler baseline, we also evaluate migrations in Slacker using a fixed throttle. For this, we manually set the throttle at the start of migration and do not adjust it for the duration of the migration.

5.1 Experimental Framework

Our experimental setup consists of a testbed running the Slacker prototype and a database benchmark used as client workloads during evaluation. We overview each piece below.

5.1.1 Prototype Testbed

Our testbed consists of quad-core 2.4 GHz Xeon servers with dedicated local disks running CentOS 5.6 and Linux kernel version 2.6.18. Our database backend consists of multiple instances of MySQL 5.1.57, while Slacker itself runs on Java 6 and uses XtraBackup 5.1 for database snapshotting during migration. Each MySQL instance is provided a dedicated block of memory to prevent competition between tenants. During evaluation, the primary Slacker server initiates migrations of local tenants to a second Slacker server, while a third server executes benchmark workloads (discussed in the following section) against the primary and/or secondary server. All three servers are connected via gigabit Ethernet.

The PID controller operates as a module within Slacker during migration, and continuously tunes the speed of migration by interacting with pv processes spawned by Slacker.

5.1.2 Tenant Database Benchmark

For benchmarking tenants during migration, we employ a heavily modified version of the opensource Yahoo Cloud Serving Benchmark (YCSB) [5]. YCSB was originally developed for benchmarking key-value stores rather than traditional relational databases, so we begin with a version augmented for transactions used in [8] and [10]. Each transaction consists of a serial set of basic database operations (SELECT, UPDATE, INSERT, etc.) selected from a preset operation distribution. Our primary benchmark workload consists of 10-operation transactions issued to a 1 GB pre-populated database. Each operation is selected at random with 85% reads and 15% writes applied to random table rows. Since disk I/O (particularly random I/O) is both the most difficult resource to partition and often a particularly stressed resource in databases, we set the InnoDB buffer size to only 128 MB to ensure a high degree of disk activity.

We further modify the YCSB benchmark by replacing the included closed workload generator with an open workload generator [20]. Rather than coupling query generation to query completion (in which a new query arrives each time one completes), we instead generate queries according to a Poisson distribution with mean inter-arrival time $\lambda$. By adjusting $\lambda$, we control the query arrival rate and thus the workload intensity sent to the database. We fix the workload multiprogramming level (MPL) at 10 and queue requests that arrive but cannot be immediately serviced by an available client thread. The latency of a transaction is simply the sum of the time spent in queue and the transaction execution time at the database (in practice, the queue time is minimal unless the server is heavily overloaded).

For benchmarking a multitenant server, we create a separate database for each tenant, then run multiple parallel instances of our benchmark (one benchmark per tenant database). Each benchmark is entirely independent and can have its own query arrival rate, operation distribution, and so forth. An example of the complete evaluation framework (with three tenants) is shown in Figure 10.

5.2 Baseline Performance

To establish baseline performance, we first run the benchmark workload with a variety of fixed throttles ranging from 5 MB/sec to 30 MB/sec. This is similar to the case study presented in Section 3.2, although the migration slack is different owing to a lower query arrival rate and smaller buffer size. While the workload is running, we migrate the tenant to a second server and record the transaction latency during the migration. The results are shown in Figure 11a (the red curve). As expected, latency is both low and stable at low throttling speeds, and increases as the throttle is increased. Around 25 MB/sec, migration slack is exceeded, and latency variance (that is, the severity of latency spikes) increases dramatically, followed by strictly increasing latency as transactions queue.

5.3 Dynamic Slack Utilization

Next, we perform the same migration using Slacker's dynamic throttle controlled by the PID controller. Here, we do not set the throttling speed at the start of migration, but simply let the PID controller adjust the speed on-the-fly and record the average throttling speed over the entire duration of migration[1]. We run the dynamic migration using latency setpoints ranging from 500 ms to 5000 ms in 500 ms increments (recall that the setpoint is the latency targeted by the PID controller). The results of these tests are shown in Figure 11a (the lower curve).

As the setpoint is increased from 500 ms (the left-most Slacker point), the average throttling speed increases dramatically at first – from 6.1 MB/sec at 500 ms to 12.6 MB/sec at 1000 ms, then gradually to 18.7 MB/sec at 2500 ms. This is because the lowest setpoints are not significantly above the baseline transaction latency — as a result, throttling must be very conservative to maintain the setpoint latencies. However, once the setpoint is increased past around 3500 ms, the throttling speed stops noticeably increasing. This is a good indication that this observed limit (roughly 23 MB/sec) is a near approximation of the true migration slack (corroborated by the results of the fixed throttle), and this slack is effectively captured by a setpoint of around 3500 ms. Lower setpoints do not capture quite as much slack but will result in lower latencies (since the controller will by definition act more conservatively).

In summary, increasing the setpoint results in higher migration speed to a point, since it provides a buffer against query bursts. However, this ultimately provides only diminishing returns, since migration speed will never exceed the available slack. This demonstrates that Slacker is able to operate within the available slack regardless of the particular setpoint latency.

5.4 Latency Maintenance

Finally, we examine how closely Slacker achieves (does not exceed) the setpoint latencies. Figure 11b adds a third line showing the actual latency (and standard deviation) achieved for each of the setpoints. We observe that the achieved latencies is very close to the setpoint latencies — in all cases, the difference is less than 10%. This demonstrates that Slacker's PID controller is able to effectively match the desired transaction performance without overshooting and potentially causing SLA violations. Furthermore, we see that the latency variance is lower in the case of Slacker than in the case of a fixed throttle of the same overall speed — this demonstrates that at a given migration speed, Slacker both decreases the average latency during migration and stabilizes latency as well, since the dynamic throttle responds to query and/or resource usage bursts by temporarily decreasing migration speed.

The reactivity of the PID controller to the workload behavior is shown in Figure 12, in which we show a time series of the dynamic throttling speed during the 1000 ms setpoint migration. Alongside the throttling speed, we plot the scaled latency of current transactions and the controller setpoint. It is evident that the throttling speed is roughly an inverse of transaction latency. During brief bursts of high latency (such as near the start of migration), Slacker decreases migration speed, sometimes even pausing migration entirely to allow the database to recover. Similar, during periods of low latency (such as in the middle of migration), Slacker capitalizes on the opportunity to increase migration speed.

In summary, Slacker achieves actual transaction latencies within 10% of the target setpoint latencies, while achieving significantly higher migration speeds at these latencies than when operating

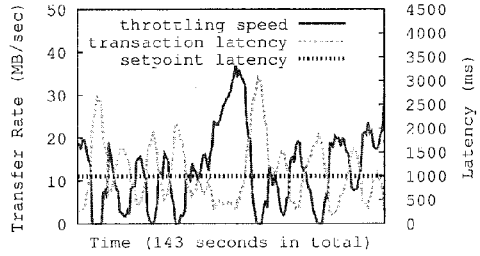

Figure 12: Throttle and latency time series (1000 ms setpoint latency).

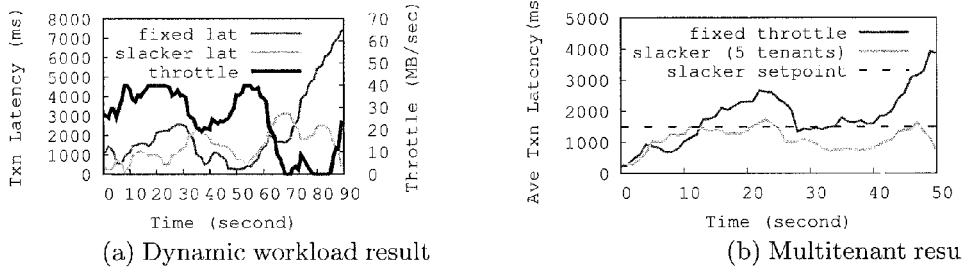

(a) Dynamic workload result
(b) Multitenant result

Figure 13: (a) Slacker performance under dynamic workloads. (b) Slacker performance in a multi-tenant database server.

with a fixed throttle. Slacker also reduces latency variance compared to a fixed throttle operating at the same average speed. This demonstrates Slacker's effectiveness at exploiting periods of lower activity to speed migration and maintaining performance during periods of higher activity by slowing migration.

5.5 Dynamic Workloads

Another important aspect of Slacker's dynamic throttle is its ability to adapt not just to short-term workload variations, but to longer-term variations as well. To evaluate this, we begin a migration and workload as before, then increase the query arrival rate by 40% after one minute (while the migration is still in progress). We run this experiment both with Slacker and a fixed throttle that achieves an equivalent migration speed and plot the results in Figure 13a.

Before the workload increase, both approaches achieve relatively stable latency. Afterward, however, the amount of slack is significantly decreased, and only Slacker is able to respond. In the case of the fixed throttle, performance rapidly degrades as the database is unable to handle both the migration and the new workload, and requests begin to queue. In the case of Slacker, migration speed is simply decreased to fit within the reduced slack, and latency is maintained close to the setpoint (1500 ms) while the migration completes.

In summary, we see that a fixed throttle may perform poorly in the presence of a changing tenant workload by failing to adjust to a new level of slack. In contrast, Slacker quickly adapts to a changing workload and maintains the desired level of performance while continuing the migration.

5.6 Multitenant Migrations

Although our experiments have focused on migration in a single-tenant environment, there is nothing in Slacker that is specific to this scenario. For a multitenant environment, Slacker simply computes latency averages across all tenant databases, including those both involved and not involved in migration. This approach assumes that SLAs are assigned per-server (as opposed to per-tenant), but this is not a particularly unrealistic assumption. We evaluate a 5-tenant scenario by creating five tenant databases and running five independent workloads, one to each of the tenants. The total server workload (the sum of the individual tenant workloads) is the same as before. We then migrate only a single tenant, while the other four continue to execute their workloads and are oblivious to the migration taking place. The average performance across all tenants (for both Slacker and the equivalent fixed throttle) is shown in Figure 13b. As in the single tenant case, we see that Slacker performs well — latency is maintained close to the setpoint, and absolute latency is significantly below the fixed throttle case.

6 Parameters and Extensions

In this section, we discuss appropriate settings of parameter values as well as several natural extensions to Slacker not previously discussed.

Choosing the Setpoint Latency

One important parameter in Slacker is the transaction latency setpoint. As shown previously, a lower setpoint results in a longer migration duration, which may suggest using a setpoint equal to the maximum value allowed under the SLA. However, there are two risks in such a greedy setpoint. First, as we have shown in the previous section, higher setpoints do not expedite the migration process beyond a certain point due to the limited availability of migration slack. Increasing beyond this point simply increases oscillations – this 'knee point' effect is illustrated in Figure 9 as well as empirically observed in Figure 11. A second risk is that, as shown in Figure 11b, higher setpoints generally result in higher variance in transaction latencies during the migration. This is undesirable since high variances will degrade performance in terms of percentile latencies.

Therefore, to choose an appropriate setpoint, historic latency distribution trends, SLA flexibility, and the relative importance of rapid migration speed should all be considered. For example, an environment in which migrations must be completed very quickly is more suited to an aggressively high setpoint, while an environment in which latency stability is most important is more suited to a conservatively low setpoint.

Choosing the PID Parameters

There are many standard approaches for choosing the parameters for a PID controller. We mention several of these approaches in Section 7. In the implementation of Slacker, we began with a well-known approach, the Ziegler-Nichols method [28], and applied some manual tuning on top of this. Slacker can easily incorporate more sophisticated control methods for these parameters, which may be used as drop-in replacements for the present fixed values. One model is *adaptive control*, which has been used successfully in resource management for virtual machines [18]. This allows PID parameters to be learned online and adapted to the situation in real time.

Throttling Both Source and Target

A simple variant on the multitenant migration provided by Slacker is one in which we consider both the source server (on which the tenant currently resides) and the target server (to which the tenant is moving). While we have focused only on the source server thus far, a migration similarly impacts the target server and may interfere with preexisting tenants.

We have implemented a version of Slacker that accounts for this case by considering transaction latencies on both the source and target server — at each timestep, the PID controller is simply provided the max of the source and target latencies. This means that whichever server has the least amount of slack will be responsible for determining the throttling rate (and this may change during the course of migration). Similar results have been obtained with this version of Slacker but are omitted due to space constraints.

Other Multitenant Levels and Migration Solutions

In this paper, we focused on the *shared-server-private-instance* level of multitenancy. Other levels are possible, such as shared-process and shared-database [22, 27, 9, 26]. Slacker can be easily extended to handle such sharing levels as long as appropriate hot backup tools are available – e.g., the Percona variant of MySQL offers table-level hot backup [25].

Slacker may also be used with other migration techniques entirely, such as those proposed in [8, 10]. In particular, any migration solution that permits throttling, and hence can limit resource consumption by the migration process, can potentially be substituted into the Slacker framework.

7 Related Work

Migration Techniques

The concept of migration in computer systems is an old one [19]. Process migration has seen limited practical use, however, due in large part to dependencies on largely immobile resources, such as file descriptors and network connections [16]. The increasing prevalence of virtualization has resulted in renewed interest in migration at the virtual machine (VM) level. An early technique for migrating VMs in a 'live' manner was presented in [12], which proposed the use of iterative 'rounds' of copying disk and memory deltas while the source VM continued to execute. Once the source and target were closely in sync, a brief handover occurs and the final delta is applied, resulting in minimal downtime. This basic technique has been shown to be robust in real scenarios, and has been implemented in the popular Xen VMM [2] as a way to migrate tenant VMs.

Database Migration

Since VM migration is heavyweight, a substantial amount of work has also been done in migrating specific types of applications, such as databases. The basic 'stop and copy' approach can be simply applied to a database by simply copying data files to the target machine or using a tool such as mysqldump [15]. This type of approach can also be applied to dynamic database provisioning, such as in Dolly [4]. More sophisticated database migration strategies that are live include systems such as Zephyr [10] and Albatross [8]. Zephyr's technique transfers a minimal 'wireframe' of the database and then pulls pages on demand from the source to the target, while executing transactions on both the source and target, thereby avoiding any significant downtime.

Our work is differentiated from systems of these types by focusing on the interference from migration both on the moving tenant and neighboring tenants. We also consider not only availability (i.e., minimizing downtime) but latency guarantees as well with a dynamic workload. We are not aware of other works that extensively study these issues, particularly when a full-speed migration may be harmful (even though availability is unchanged). Finally, since Slacker operates at the middleware level, it can easily be applied to an off-the-shelf underlying DBMS.

Migration Throttling

Throttling a migration to reduce interference from the migration itself has been employed in a cursory manner but has not been extensively studied. The VM live migration approach in [12] employs simple dynamic rate limiting but focuses on minimizing copy bandwidth and strictly increases, hence ignoring the potential effects of a changing background workload. The wide-area migration approach in [3] uses a simple heuristic write throttle to handle write-intensive workloads, but only considers an availability SLA rather than also considering latency. The migration implementation in Xen was extended in [14] to throttle the migrating tenant rather than the migration itself, thereby reducing bandwidth and the final downtime period. The tradeoff of migration speed with interference is mentioned briefly in [10] but not studied. Additionally, one issue with on-demand approaches such as in [10] is that throttling is problematic, since slowing on-demand pulls exacerbates latency rather than mitigating it as in a throttled background transfer.

PID Controllers

Proportional-integral-derivative controllers have a long history in industrial control systems, and are widely used in many systems [13]. Common variants on the classical PID controller include systems in which one or more of the components are left out (e.g., a P controller or a PI controller). Effective methods for tuning PID controllers are an active area of work, with some methods dating back decades, such as the well-known Ziegler-Nichols method [28]. A more recent overview of PID control system design and tuning is given in [1]. PID control systems are most often used in systems with physical actuator, such as maintaining pressure or temperature. In the database area, PID control has been used in load shedding in stream databases [24]. We believe that our work presents a novel use of PID controllers in conjunction with migration and system performance. We are not aware of any other applications of PID controllers to problems in this space.

8 Conclusion and Future Work

Database migration is an important technique to partition and consolidate databases and workloads in a multitenant server environment. However, migration itself can have negative impacts on tenant performance, since it consumes resources that may be in use by tenant workloads. We formalize this issue as 'migration slack', and demonstrate how non-interfering migrations can be performed using throttling to exploit the available slack.

Our complete end-to-end migration system, Slacker, intelligently uses slack to perform rapid but safe live migrations using a dynamic throttle. The throttle is managed online by a PID controller that maintains acceptable latency of database transactions while simultaneously performing the migration. The controller also allows migration speed and acceptable query latency (e.g., as determined by a tenant SLA) to be traded off through the use of a target latency setpoint, and is able to adapt to a varying workload environment while maintaining good performance.

Slacker currently operates with a multi-process model of multitenancy, but we are working on extending this to other models, such as single-process (e.g., one MySQL daemon handling all tenants rather than just one). We are also considering other questions related to migration that may be useful within a system like Slacker, such as when migrations are necessary, which tenants should be migrated, and where such tenants should be migrated to. These questions are synergistic to the techniques focused on in Slacker, which provide an efficient and minimally disruptive method of actually executing a given migration.

Acknowledgments

We thank Sudipto Das and Aaron Elmore for providing us with their extension to the Yahoo Cloud Serving Benchmark. This work was supported in part by NSF grants CNS-1117221, CNS-0916972, and a gift from NEC.

References

[1] K. H. Ang, G. Chong, and Y. Li. PID control system analysis, design, and technology. *IEEE Transactions on Control Systems Technology*, 13(4):559 – 576, 2005.

[2] P. Barham, B. Dragovic, K. Fraser, S. Hand, T. Harris, A. Ho, R. Neugebauer, I. Pratt, and A. Warfield. Xen and the art of virtualization. In *SOSP*, 2003.

[3] R. Bradford, E. Kotsovinos, A. Feldmann, and H. Schiöberg. Live wide-area migration of virtual machines including local persistent state. In *VEE*, 2007.

[4] E. Cecchet, R. Singh, U. Sharma, and P. J. Shenoy. Dolly: virtualization-driven database provisioning for the cloud. In *VEE*, 2011.

[5] B. F. Cooper, A. Silberstein, E. Tam, R. Ramakrishnan, and R. Sears. Benchmarking cloud serving systems with ycsb. In *SOCC*, 2010.

[6] C. Curino, E. Jones, R. A. Popa, N. Malviya, E. Wu, S. Madden, H. Balakrishnan, and N. Zeldovich. Relational Cloud: A Database Service for the Cloud. In *CIDR*, 2011.

[7] C. Curino, E. P. C. Jones, S. Madden, and H. Balakrishnan. Workload-aware database monitoring and consolidation. In *SIGMOD*, 2011.

[8] S. Das, S. Nishimura, D. Agrawal, and A. E. Abbadi. Albatross: Lightweight elasticity in shared storage databases for the cloud using live data migration. *PVLDB*, 4, 2011.

[9] A. J. Elmore, S. Das, D. Agrawal, and A. El Abbadi. Who's driving this cloud? towards efficient migration for elastic and autonomic multitenant databases. Technical Report CS-2010-05, UCSB, 2010.

[10] A. J. Elmore, S. Das, D. Agrawal, and A. El Abbadi. Zephyr: live migration in shared nothing databases for elastic cloud platforms. In *SIGMOD*, 2011.

[11] H. Hacıgümüş, J. Tatemura, W.-P. Hsiung, H. J. Moon, O. Po, A. Sawires, Y. Chi, and H. Jafarpour. CloudDB: One size fits all revived. In *SERVICES*, 2010.

[12] C. C. Keir, C. Clark, K. Fraser, S. H, J. G. Hansen, E. Jul, C. Limpach, I. Pratt, and A. Warfield. Live migration of virtual machines. In *NSDI*, 2005.

[13] W. S. Levine. *The Control Handbook*. CRC, 2011.

[14] Z. Liu, W. Qu, W. Liu, and K. Li. Xen live migration with slowdown scheduling algorithm. In *PDCAT*, 2010.

[15] Oracle mysqldump – a database backup program. http://dev.mysql.com/doc/refman/5.1/en/mysqldump.html.

[16] D. S. Milojičić, F. Douglis, Y. Paindaveine, R. Wheeler, and S. Zhou. Process migration. *ACM Comput. Surv.*, 32:241–299, 2000.

[17] Google Protocol Buffers. http://code.google.com/apis/protocolbuffers/.

[18] P. Padala, K. G. Shin, X. Zhu, M. Uysal, Z. Wang, S. Singhal, A. Merchant, and K. Salem. Adaptive control of virtualized resources in utility computing environments. In *EuroSys*, 2007.

[19] M. L. Powell and B. P. Miller. Process migration in DEMOS/MP. In *SOSP*, 1983.

[20] B. Schroeder, A. Wierman, and M. Harchol-Balter. Open versus closed: A cautionary tale. In *NSDI*, 2006.

[21] B. Schwartz and P. Zaitsev. A brief introduction to goal-driven performance optimization. White paper, Percona, 2010.

[22] A. A. Soror, U. F. Minhas, A. Aboulnaga, K. Salem, P. Kokosielis, and S. Kamath. Automatic virtual machine configuration for database workloads. *ACM Trans. Database Syst.*, 35(1), 2010.

[23] J. Tatemura and H. Hacıgümüş. Microsharding: A declarative approach to support elastic OLTP workloads. In *LADIS*, 2011.

[24] Y.-C. Tu, S. Liu, S. Prabhakar, and B. Yao. Load shedding in stream databases: a control-based approach. In *VLDB*, 2006.

[25] Percona XtraBackup. http://www.percona.com/software/percona-xtrabackup/.

[26] P. Xiong, Y. Chi, S. Zhu, H. J. Moon, C. Pu, and H. Hacıgümüş. Intelligent management of virtualized resources for database systems in cloud environment. In *ICDE*, 2011.

[27] F. Yang, J. Shanmugasundaram, and R. Yerneni. A scalable data platform for a large number of small applications. In *CIDR*, 2009.

[28] J. G. Ziegler and N. B. Nichols. Optimal settings for automatic controllers. *Transactions of the ASME*, 64:759–768, 1942.

What is claimed is:

1. A method for migration from a multitenant database, comprising:
    taking a snapshot of an original database to be migrated with a hot backup process, such that the database is still capable of answering queries during the hot backup process;
    selecting a database migration method that does not generate a service level agreement (SLA) violation and otherwise selecting a method that generates the fewest SLA violations during the database migration;
    applying a proportional-integral-derivative (PID) controller to determine a speed of migration based on system performance, wherein the PID controller has a proportional path, an integral path and a derivative path, each path is scaled by coefficients $K_p$, $K_i$, and $K_d$ respectively, wherein an output at time t with error e(t) is given by:

$$\text{output}(t) = K_p e(t) + K_i \int_0^t e(\tau) d\tau + K_d \frac{d e(t)}{dt};$$

maintaining a query log of all queries to the tenant database after the hot backup process begins;
    initializing a new database at a target server using the snapshot;
    replaying the query log to synchronize the new database with the original database; and
    answering new queries with the new database and not the original database.

2. The method of claim 1, further comprising computing a target level of performance based on meeting service level agreement (SLA) guarantees.

3. The method of claim 2, further comprising moderating a speed of the hot backup process based on current and historic system performance.

4. The method of claim 3, wherein moderating the speed comprises comparing current and historic system performance to the computed target level of performance to whether to increase or decrease speed in accordance with a respective shortfall or surplus relative to the target level of performance.

5. The method of claim 3, wherein moderating the speed comprises allocating resources to the hot backup process to optimize a backup speed while maintaining SLA guarantees.

6. The method of claim 5, wherein the resources comprise a storage input/output rate and a network bandwidth.

7. The method of claim 3, wherein moderating the speed comprises using a proportional-integral-derivative controller to adaptively respond to changes in an amount of slack resources.

8. The method of claim 1, wherein the amount of slack resources is determined by comparing the measured transaction latency to a target transaction latency that represents an optimal balance between speed of the backup process and transactions for other tenants.

9. A multitenant database system, comprising:
    code to select a database migration method that does not generate a service level agreement (SLA) violation and otherwise select a method that generates the fewest SLA violations during the database migration;
    a proportional-integral-derivative (PID) controller coupled to the database system to determine a speed of migration based on system performance, wherein the PID controller has a proportional path, an integral path and a derivative path, each path is scaled by coefficients $K_p$, $K_i$, and $K_d$ respectively, wherein an output at time t with error e(t) is given by:

$$\text{output}(t) = K_p e(t) + K_i \int_0^t e(\tau) d\tau + K_d \frac{d e(t)}{dt};$$

and
    a multitenant database configured to take a snapshot of an original tenant database to be migrated with a hot backup process, such that the original tenant database is still capable of answering queries during the hot backup process, to maintain a query log of all queries to the original tenant database using a processor after the hot backup process begins, to initialize a migrated tenant database using a received snapshot, and to replay a received query log to synchronize the migrated tenant database with an original tenant database.

* * * * *